Nov. 11, 1924.

P. KUCERA 1,515,347

DEVICE FOR MAKING GLASS MOLDS AND THE LIKE

Filed June 25, 1921  4 Sheets-Sheet 3

Inventor
Peter Kucera
By George Ramsey
his Attorney

Nov. 11, 1924.

P. KUCERA 1,515,347

DEVICE FOR MAKING GLASS MOLDS AND THE LIKE

Filed June 25, 1921    4 Sheets-Sheet 4

Inventor
Peter Kucera

By George Ramsey his Attorney

Patented Nov. 11, 1924.

1,515,347

UNITED STATES PATENT OFFICE.

PETER KUCERA, OF SOUTH CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

DEVICE FOR MAKING GLASS MOLDS AND THE LIKE.

Application filed June 25, 1921. Serial No. 480,340.

*To all whom it may concern:*

Be it known that I, PETER KUCERA, a citizen of the United States, and a resident of the city of South Connellsville, in the county of Fayette, State of Pennsylvania, have invented new and useful Improvements in Devices for Making Glass Molds and the like, of which the following is a specification.

The present invention relates broadly to devices for making glass machinery and more specially to a mechanism for automatically forming molds having configurated walls.

The principal object of the present invention is an automatic machine for shaping the interior of a mold wall in accordance with a predetermined configurated pattern.

Another object of the present invention is a device of the character specified and wherein the design on the mold wall is controlled by a plurality of separate pattern members.

A still further object of the present invention is a device of the character specified wherein the character of the mold wall pattern parallel to the axis of the mold is determined by a templet and the character of the pattern circumferentially of the mold wall is determined by a plurality of individual pattern members.

A still further object of the present invention is a device of the character specified and wherein a plurality of independent pattern members are adapted to cooperate to produce the configurated design desired.

A further and important object of the present invention is a device of the character specified and wherein a single tracing member is adapted to cooperate with a plurality of pattern members and wherein the contact of the templet and the plurality of pattern members is adapted to be either consonate or successive.

Other and further objects of the present invention will in part be obvious and will in part be pointed out hereinafter by reference to the accompanying drawings wherein like parts are represented by like characters throughout the several figures thereof.

Figure 9:
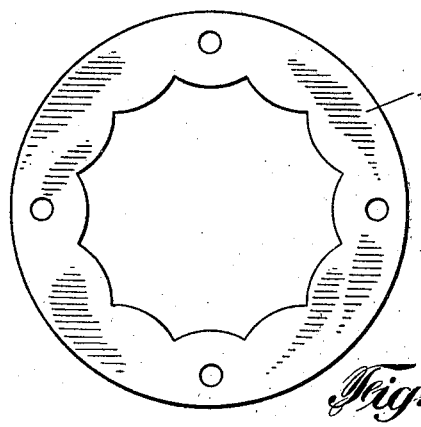
Figure 10:
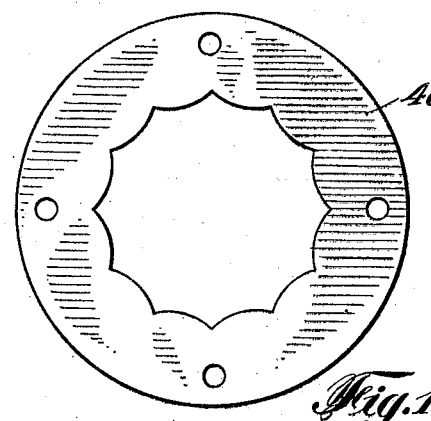
Figure 11:
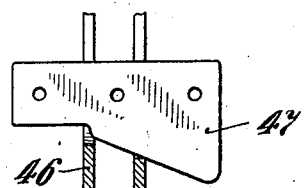
Figure 12:
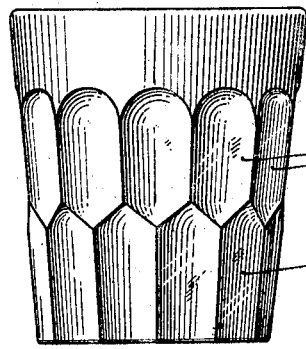

Figures 9 and 10 respectively illustrate primary and secondary pattern plates adapted to cooperate with the templet shown in Figure 11 to produce a mold to manufacture the tumbler shown in Figure 12;

Figure 12 illustrates a double fluted tumbler.

Figure 14:
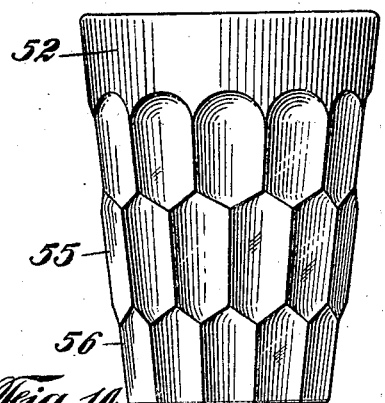
Figure 13:
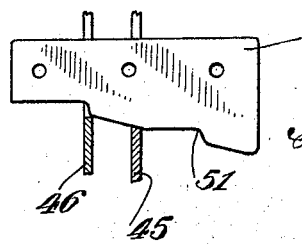

Figure 13 illustrates a templet for cooperating with the pattern plates illustrated in Figures 9 and 10 to produce a mold for manufacturing tumblers of the design shown in Figure 14.

Figure 14 illustrates a tumbler with three zones of flutings.

The majority of glass ware and particularly packers ware is manufactured in molds which are adapted to shape the exterior of the glassware. These molds may be either adaptable for pressing or blowing, dependent upon the character of ware being made. Heretofore in the art where any ornamentation such as fluting, beading, ribbing, or other configuration has been desired, it has been necessary to manufacture the molds by careful hand work. This has rendered such molds expensive and has also caused certain small variations in design in a series of similar molds, which variations are undesirable, and the hand made molds have added very greatly to the cost of the production of such ornamented ware. The reason for this is that the molds in the first place were very expensive and in the second place molds of this class wear more rapidly than molds having a smooth cylindrical wall. In the manufacture of the ordinary block mold adapted for pressing fluted tumblers it has required a skilled workman from two to three days to produce a single mold and where a plurality of molds were made each would differ from the other since no two pieces made by hand are identical.

The present invention overcomes the difficulties of the known art and makes it possible to accurately and automatically manufacture configurated molds in accordance with predetermined patterns and wherein a completed mold may be finished within a few hours, and where a plurality of molds are desired each mold is identically the same as every other mold of the same pattern since the pattern shape and size of the molds are all automatically determined by the forming machine.

The present invention comprises, more specially, constructions wherein compound curves or a plurality of individual configurations are adapted to be automatically formed on the mold body. These configurations are all determined by a plurality of interengaging forming members. The embodiment of the invention, which will hereinafter be described in detail, may comprise a shaft carrying on one portion the mold body to be operated on and another portion of the same shaft carries the master pattern or pattern plates adapted to determine the circumferential design on the mold body. This master pattern is constructed to cooperate with the templet carried on an arm which is connected to an oscillatory head or turret on the tool bed or carriage of the machine and this templet is adapted to engage an edge of the master pattern which rotates consonately with the mold. The templet is fed longitudinally over the rotating pattern plate as the tool advances into the mold so that the longitudinal element in the pattern is controlled by the templet. Where it is desired that the longitudinal element of the design shall be spiral or shall vary in any way from a straight longitudinal line, the work face of the templet may be curved or variously shaped relatively to the direction of longitudinal movement of the templet so that as the pattern plate revolves, and the templet slides longitudinally on the pattern plate, the work face of the templet will engage the pattern plate sooner or later as the case may be, in the rotation of the pattern member and mold.

The present invention also contemplates the use of a plurality of pattern plates each of which is adapted to impose a certain factor of the general configuration usually but not necessarily upon a predetermined zone in the depth or longitudinal dimension of the mold. By this means a multiple of designs may be obtained by very simple and inexpensive pattern plates and templets. These designs may be changed wholly or in part by the use of a plurality of different templets with the same pattern plate or plates or by the use of different pattern plates with the same templet.

Figure 1:
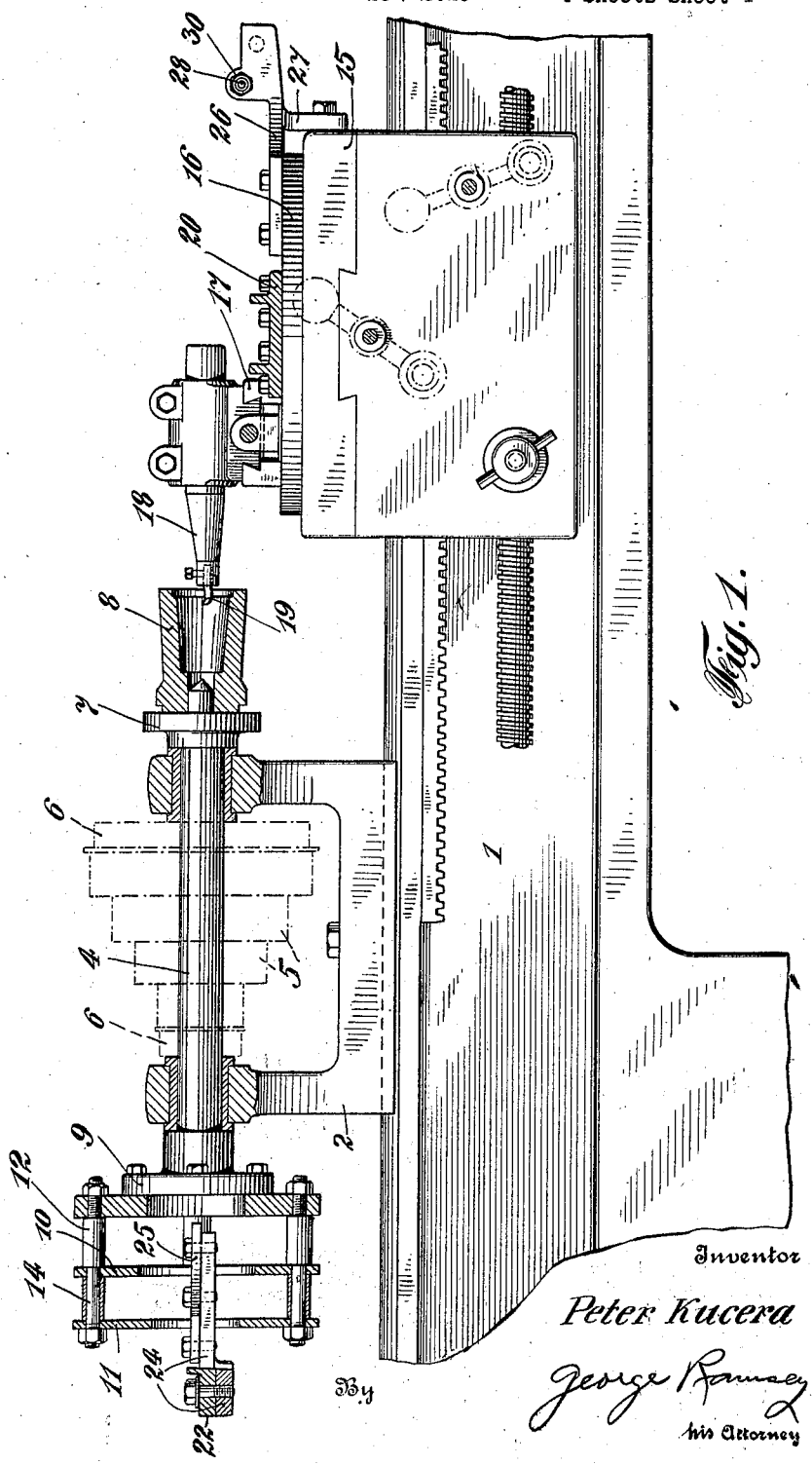
Figure 1 is a side elevational view illustrating one embodiment of the present invention and showing portions of a turret lathe to which the invention is adapted, more or less diagrammatically.
Figure 2:
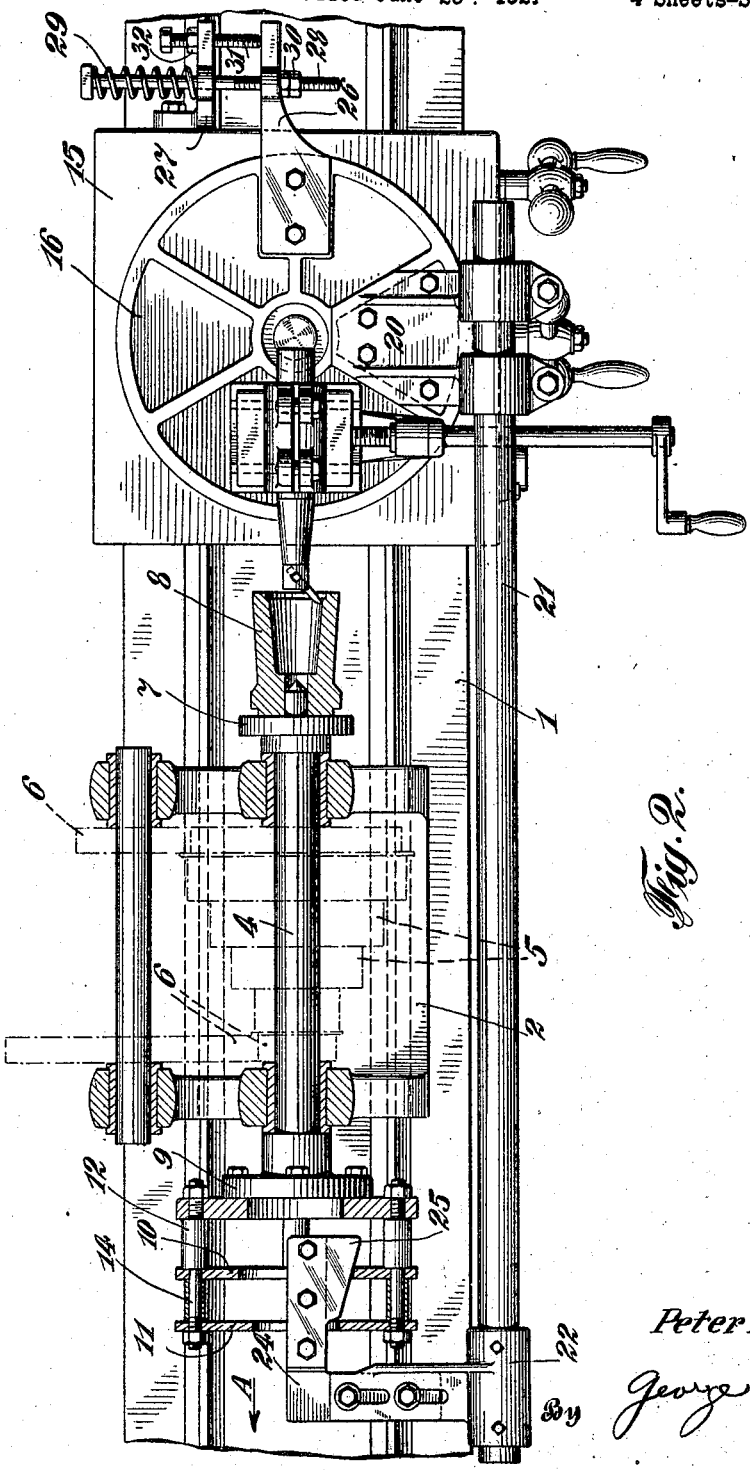
Figure 2 is a plan view partly in section of the mechanism illustrated in Figure 1.

Referring now more particularly to the drawings and more specially to Figures 1 and 2, the present embodiment of the invention may comprise an attachment to a lathe and the drawings illustrate certain well known parts of such lathe more or less diagrammatically. The lathe bed 1 carries the usual head stock 2 in which is mounted the main shaft 4 which carries the usual cone pulley 5 that cooperates with the back gears 6. The fore-end of the main shaft may be provided with a suitable holder 7 that carries the block mold body 8, or the like.

The other end of the main shaft is also provided with a holder 9 and upon which master pattern plates 10 and 11 are mounted. The plate 10 will be referred to as the primary plate, and plate 11 will be designated as the secondary plate. The mounting of these plates may be accomplished in many ways, as for example, by spacing the plates with special blocks 12 on carrier bolts 14 which are threaded into the holder 9. The tool carriage 15 carries an oscillatory head 16 provided with cross feed 17 on which is mounted a tool holder 18 that carries a cutting tool 19. The head 16 also carries arm bracket 20 in which the control arm 21 is removably mounted. This control arm carries at the forward end an extension 22 provided with an elbow 24 on which a templet 25 is adapted to be mounted and to extend through the opening in the master patterns 10 and 11. It is desirable that arrangement be made to tend to maintain the edge of the templet 24 in contact with the edges of the master patterns and to this end a bracket 26 may be mounted on the head 16 and a similar bracket 27 may be mounted on the tool carriage 15. A spring support bolt 28 is adapted to pass through the brackets 26 and 27 and carry on one end the compressible spring 29 and on the other end a pair of lock nuts 30. The action of the spring 29 tends to turn the head 16 in such manner as to maintain the templet 25 against the edge of the openings in the patterns 10 and 11. In order to provide a stop for limiting the extent of turning due to the spring 29, a stop bolt 31 provided with a lock nut 32 is mounted on one of the brackets preferably the bracket 27, in such manner as to engage with a portion of the bracket 26. This stop bolt is adjustable and thus forms a predetermined limit to the turning movement of the head 16. It is to be understood that the lathe is provided with the usual longitudinal and cross feeds and other constructions and attachments common in the art of lathes.

Figure 3:
Figure 3 is a front view showing a spiral or curved edge templet adapted to produce molds having spiral flutes therein which will mold tumblers or the like having spiral ornamentations, as illustrated in Figure 4.
Figure 4:
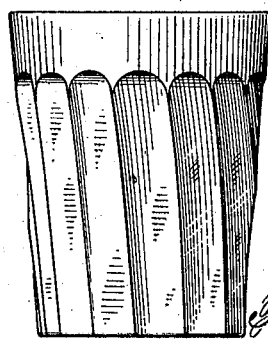
Figure 4 illustrates a glass tumbler ornamented with spiral flutings.
Figure 5:
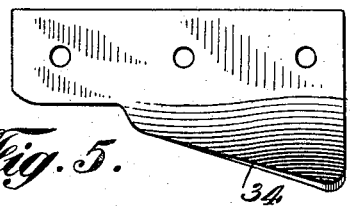
Figure 5 is a plan view of the templet shown in Figure 3.

Referring now to Figures 3, 4, and 5, it will be noted that Figure 4 illustrates a glass tumbler ornamented with spiral flutings. These flutings may be either in the form of grooves or ribs. The production of the mold for the manufacture of this tumbler is accomplished by using a templet such as illustrated in Figures 3 and 5 and wherein the front or operative edge 34 of the templet is curved in the form of a spiral relatively to the length of the templet. This templet 34 is mounted on the elbow 24 when it is desired to produce a tumbler as illustrated in Fig. 4. As the cutting tool is fed into the mold the edge 34 of the templet will travel relatively to the master plate and as the edge proceeds longitudinally relatively to this plate the contact of the configuration of the plate with the edge is either delayed or advanced, by the longitudinal movement and the spiral edge, dependent on the direction of rotation of the master plate. In exactly the same manner a relative movement of the cutting tool is retarded or advanced on the mold and consequently the path traced by this tool will be spiral so far as the longitudinal components thereof are concerned. Where the master plate is provided with a symmetric multi-sided opening the result will be spiral flutes and if the pattern plate has the sides of the multi-sided opening curved outwardly the spiral members will appear as spiral grooves in the mold and as spiral ribs on the tumbler.

Figure 6:
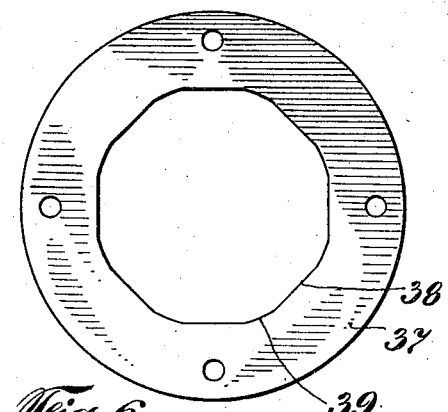
Figure 6 is a plan view of a primary pattern plate.
Figure 7:
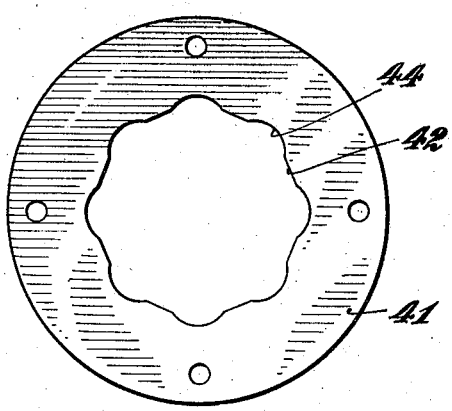
Figure 7 is a plan view of the secondary pattern plate.
Figure 8:
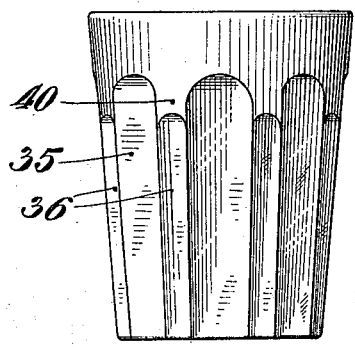
Figure 8 illustrates a tumbler from a mold formed by pattern plates 7 and 8.

Referring now to Figures 6, 7 and 8, it will be noted that Figure 8 illustrates a tumbler having said flutes in the form of a wide series 35 and a narrow series 36. The mold for this tumbler may be produced by the use of the two master pattern plates illustrated in Figures 6 and 7 wherein Figure 6 is the primary pattern and Figure 7 the secondary pattern, and wherein the designation of the primary pattern may be applied to the one which first contacts with the templet, and secondary as the one which contacts next with the templet. In the primary pattern 37 the edge portions 38 of the pattern are straight and the edge portions 39 are curved. The straight portions 38 determine the shape of the mold which forms the wide flutes 35 whereas the curved portions 39 form that portion which makes the cylindrical portions 40 between the upper ends of the flutes 35. The secondary pattern 41 when in place occupies the position of the pattern plate 11 in Figures 1 and 2 and as the templet 25 moves in the direction of the arrow A it will be obvious that it will engage the pattern 41 after it has been in engagement with the primary pattern 37 for some time. In the secondary pattern 41 the portions 42 are straight and the edge of the pattern plate between these straight portions is cut away as at 44. When these pattern plates are in position on the holder 9 of the machine the projection of the straight edges 42 on the secondary plate coincides with the curved portions 39 on the primary plate and the cut away parts 44 of the secondary plate coincide with the straight portions 38 on the primary plate. The superposed projections of the two plates therefore is such that when the primary pattern alone engages the templet the wide flutes 35 with cylindrical portions 40 between are formed on the mold wall and as the templet progresses in the direction of the arrow A Figure 2 it begins to engage the secondary plate on the straight portions 42. As soon as this happens the narrow flutes 36 are generated. As the tools begin to advance into the mold it is from this time on under control of both patterns, with one pattern developing the wide flutes 35 and the other pattern developing the narrow flutes 36.

Referring to Figures 9, 10, 11 and 12, the primary pattern 45 and the secondary pattern 46 are constructed with inwardly curved sided figures and wherein the position of the curves in the secondary pattern is advanced one half the length of a side, with reference to the position of the curves in the primary pattern 45. Where these patterns cooperate with a templet as illustrated in Figure 11 a mold is produced which will manufacture a double fluted tumbler illustrated in Figure 12. Under these conditions the secondary pattern is provided with an opening sufficiently small to take the templet entirely from control of the primary pattern after the templet has progressed such a predetermined amount in its longitudinal travel as to enter the secondary templet. The result is that the master pattern 45 controls the formation of the zone of the mold which produces the flutes 48 in the tumbler 47 and the secondary pattern 46 controls the formation of that portion of the mold which forms the lower flutes 49.

As further illustrating the versatility and adaptability of the present invention, Figure 13 illustrates a templet 50 which is provided in its operative edge with cut away portion 51. This cut away portion is constructed with reference to the distance between the location of the pattern plates at 10 and 11 so that the templet first cooperates with the primary pattern located at 10 and then with the secondary pattern located at 11 during which time the primary pattern at 10 is over the cut out portion 51. As the templet 50 is moved forward the pattern at 10 engages the edge of the templet beyond the notch 51 and again becomes operative to control the movement of the cutting tool. The result of this type of templet when used with the patterns 45 and 46, shown in Figures 9 and 10, is to produce a mold to manufacture a tumbler 52 shown in Figure 14 and wherein three zones of fluting occur. The upper zone 54 is a result of the first operation of the primary pattern 45 while the zone 55 is a result of the operation of the secondary pattern 46 and the zone 56 is formed by the primary pattern 45 again being operative.

From the foregoing description it will appear that by using a plurality of pattern plates and also by using templets having varied shaped work faces an endless variety of shapes may be imparted to mold bodies by different arrangements of the various types of templates and plate patterns. It will also be clear that both the templets and plate patterns are exceedingly simple in construction and easily manufactured and therefore these changes from one pattern to another may be made at a very low expense.

Having thus described my invention, I claim:

1. In a machine for shaping molds for glass machines or the like, a main shaft, a plurality of pattern plates rotated by the main shaft, a cutting tool, a templet cooperating with the cutting tool, and having a curved face cooperating with the pattern plates to determine the path of the forming tool whereby the pattern plates may be selectively effective to determine the operation of the cutting tool.

2. In a machine for shaping molds for glass machines or the like, a main shaft, a plurality of pattern plates rotated by the main shaft, a forming tool, and a templet cooperating with the forming tool and cooperating with the pattern plates to determine the path of the forming tool.

3. In a machine for shaping molds for glass machines or the like, a main shaft, a plurality of spaced apart pattern plates provided with pattern openings and rotated by the main shaft, a forming tool, and a templet cooperating with the tool, and having a curved face cooperating with the pattern plates to determine the path of the forming tool whereby the pattern plates may be selectively effective to determine the operation of the cutting tool.

4. In a machine for shaping molds for glass machines or the like, a main shaft, a plurality of pattern plates having openings therein rotated by the main shaft, a forming tool, and a templet cooperating with the tool and having a curved face extending into said openings and cooperating with the pattern plates to determine the path of the forming tool whereby the pattern plates may be selectively effective to determine the operation of the cutting tool.

5. In a machine for shaping molds for glass machines or the like, a main shaft, a plurality of pattern plates having openings therein rotated by the main shaft, a forming tool, a templet cooperating with the tool and having a curved face, and means to draw the templet against the edges of the pattern plate openings to determine the path of the forming tool whereby the pattern plates may be selectively effective to determine the operation of the cutting tool.

6. In a machine for shaping molds for glass machines or the like, a main shaft, a plurality of pattern plates rotated by the main shaft, a forming tool, a templet cooperating with the tool and having a curved face and cooperating with the pattern plates to determine the path of the forming tool whereby the pattern plates may be selectively effective to determine the operation of the cutting tool, said main shaft carrying both the mold being shaped and the pattern plates.

7. In a machine for shaping molds for glass machines or the like, a main shaft, a plurality of spaced apart pattern plates provided with pattern openings and rotated by the main shaft, a forming tool and a templet cooperating with the tool, and having a curved face and cooperating with the pattern plates to determine the path of the forming tool whereby the pattern plates may be selectively effective to determine the operation of the cutting tool, said main shaft carrying both the mold being shaped and the pattern plates.

8. In a machine for shaping molds for glass machines or the like, a main shaft, a plurality of pattern plates having openings therein rotated by the main shaft, a forming tool, a templet cooperating with the tool, and having a curved face and extending into said openings, and means to draw the templet against the edges of the pattern plate openings to determine the path of the forming tool whereby the pattern plates may be selectively effective to determine the operation of the cutting tool.

9. In a machine for shaping molds for glass machines or the like, a main shaft, a plurality of spaced apart pattern plates provided with pattern openings and rotated by the main shaft, a forming tool, a templet cooperating with the tool, and extending into said openings, and means to draw the templet against the edges of the pattern plate openings to determine the path of the forming tool.

10. In a machine for shaping molds for glass machines or the like, a main shaft, a plurality of spaced apart pattern plates provided with pattern openings and rotated by the main shaft, a cutting tool, a templet cooperating with the tool and having a curved face and means to draw the templet against the edges of the pattern plate openings to determine the path of the forming tool whereby the pattern plates may be selectively effective to determine the operation of the cutting tool.

11. In a machine for forming configurated mold bodies, the combination of a forming tool, a plurality of cooperative pattern members, and a templet operatively connected to the tool and adapted to cooperate successively with the patterns to guide the said tool in shaping said mold.

12. In a machine for forming configurated mold bodies, the combination of a forming tool, a plurality of hollow plate pattern members, and a templet operatively connected to the tool and adapted to cooperate successively with the patterns to guide the said tool in shaping said mold.

13. In a machine for forming configurated mold bodies, the combination of a forming tool, a plurality of pattern members, a longitudinally movable templet operatively connected to the tool and having a face curved to the plane of movement and adapted to cooperate with the patterns to guide the said tool in shaping said mold.

14. In a machine for forming configurated mold bodies, the combination of a forming tool, a plurality of pattern members, a templet operatively connected to the tool and adapted to cooperate with the patterns to guide the said tool in shaping said mold, and means to simultaneously feed the tool to the mold, and the templet over the pattern members.

15. In a machine for forming configurated mold bodies, the combination of a forming tool, a plurality of hollow plate pattern members, a templet operatively connected to the tool and adapted to cooperate with the patterns to guide the said tool in shaping said mold, and a common shaft carrying both the mold and the pattern plates.

16. In a machine for forming configurated mold bodies, the combination of a forming tool, a plurality of pattern members, a longitudinally movable templet operatively connected to the tool and having a face curved to the plane of movement and adapted to cooperate with the patterns to guide the said tool in shaping said mold and means to simultaneously feed the tool to the mold, and the templet over the pattern members.

17. In a machine for forming configurated mold bodies, the combination of a forming tool, a plurality of hollow plate pattern members, a longitudinally movable templet operatively connected to the tool and having a face curved to the plane of movement and adapted to cooperate with the patterns to guide the said tool in shaping said mold, means to simultaneously feed the tool to the mold and the templet over the pattern members, and a common shaft carrying both the mold and the pattern plates.

18. In a machine for forming configurated molds for glass machines, a pattern plate mounted for rotation, a templet having longitudinal movement over the pattern plate, a tool, a tool carriage upon which said tool is mounted for oscillation, and a stop carried by the carriage and adapted to control the limit of oscillation of the said tool.

19. In a machine for forming configurated molds for glass machines, a pattern plate mounted for rotation, a templet having an indented edge and adapted for longitudinal movement over the pattern plate, a tool, a tool carriage upon which said tool is mounted for oscillation; and a stop carried by the carriage and adapted to control the limit of oscillation of the said tool.

20. In a machine for forming configurated molds for glass machines, a pattern plate mounted for rotation, a templet having longitudinal movement over the pattern plate, said templet having a work face curved to the direction of movement of the templet, a tool, a tool carriage upon which said tool is mounted for oscillation; and a stop carried by the carriage and adapted to control the limit of oscillation of the said tool.

21. In a machine for forming configurated molds for glass machines, a pattern plate mounted for rotation, a templet having longitudinal movement over the pattern plate, a tool, a tool carriage upon which said tool is mounted for oscillation, an arm mounted on the carriage and carrying the templet, and a stop carried by the carriage and adapted to control the limit of oscillation of the said tool.

22. In a machine for forming configurated molds for glass machines, a pattern plate mounted for rotation, a templet having longitudinal movement over the pattern plate, a tool, a tool carriage upon which said tool is mounted for oscillation, and an arm mounted on the carriage and carrying the templet.

23. In a machine for forming configurated molds for glass machines, a pattern plate mounted for rotation, a templet having longitudinal movement over the pattern plate, a tool, a tool carriage upon which said tool is mounted for oscillation, said templet having an indented edge and having a work face curved to the direction of movement of said templet relatively to said pattern plate.

24. In a machine for forming configurated molds for glass machines, a pattern plate mounted for rotation, a templet having longitudinal movement over the pattern plate, a tool, said templet having a work face curved to the direction of movement of the templet, a tool carriage upon which said tool is mounted for oscillation, an arm mounted on the carriage and carrying the templet, and a stop carried by the carriage and adapted to control the limit of oscillation of the said tool.

25. In a machine for forming configurated molds for glass machines, a pattern plate mounted for rotation, a templet having an indented edge and adapted for longitudinal movement over the pattern plate, a tool, a tool carriage upon which said tool is mounted for oscillation, and an arm mounted on the carriage and carrying the templet.

26. In a machine for forming configurated molds for glass machines, a pattern plate mounted for rotation, a templet having longitudinal movement over the pattern plate, said templet having a work face curved to the direction of movement of the templet, a tool, a tool carriage upon which said tool is mounted for oscillation, and an arm mounted on the carriage and carrying the templet.

27. In a machine for forming configurated molds for glass machines or the like, the combination of a main shaft adapted to carry the mold, a forming tool, a rotatable pattern member, and a curved templet movable over the pattern member and adapted to control the movement of the cutting tool.

28. In a machine for forming configurated molds for glass machines or the like, the combination of a main shaft adapted to carry the mold, a forming tool, a rotatable pattern member also mounted on the main shaft, and a curved templet movable over the pattern member and adapted to control the movement of the cutting tool.

29. In a machine for forming configurated molds for glass machines or the like, the combination of a main shaft adapted to carry the mold, a forming tool, a rotatable pattern member, and a curved templet movable over the pattern member and adapted to control the movement of the cutting tool and to trace a curved path on the mold.

30. In a machine for forming configurated molds for glass machines or the like, the combination of a main shaft adapted to carry the mold, a forming tool, a rotatable pattern member, and a spiral faced templet movable over the pattern member and adapted to control the movement of the cutting tool to trace the design of the pattern member in spiral form on the mold body.

31. In a machine for forming configurated molds for glass machines or the like, the combination of a main shaft adapted to carry the mold, a forming tool, a rotatable pattern member also mounted on the main shaft, and a spiral faced templet movable over the pattern member and adapted to control the movment of the cutting tool to trace the design of the pattern member in spiral form on the mold body.

PETER KUCERA.